No. 767,010. PATENTED AUG. 9, 1904.
P. C. PETERSON.
VEHICLE AXLE.
APPLICATION FILED JUNE 4, 1904.
NO MODEL.

Witnesses:-
F. C. Fliedner

Inventor
Peter C. Peterson
By Geo. H. Strong.
Atty

No. 767,010. Patented August 9, 1904.

UNITED STATES PATENT OFFICE.

PETER C. PETERSON, OF GEYSERVILLE, CALIFORNIA.

VEHICLE-AXLE.

SPECIFICATION forming part of Letters Patent No. 767,010, dated August 9, 1904.

Application filed June 4, 1904. Serial No. 211,150. (No model.)

*To all whom it may concern:*

Be it known that I, PETER C. PETERSON, a citizen of the United States, residing at Geyserville, in the county of Sonoma and State of California, have invented new and useful Improvements in Vehicle-Axles, of which the following is a specification.

My invention relates to improvements in vehicle-axles; and it consists in devices by which the axle is made resilient independent of its connections with the vehicle-body.

My invention comprises details of construction, which will be more fully explained by reference to the accompanying drawings, in which—

Figure 1:
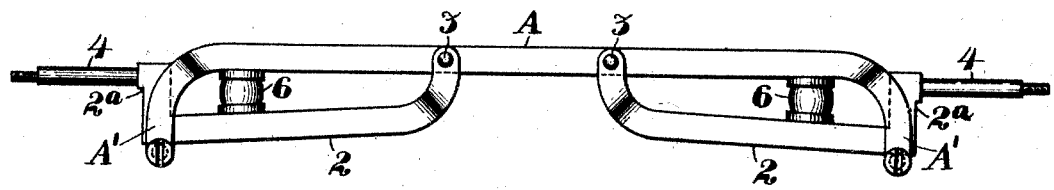
Figure 2:
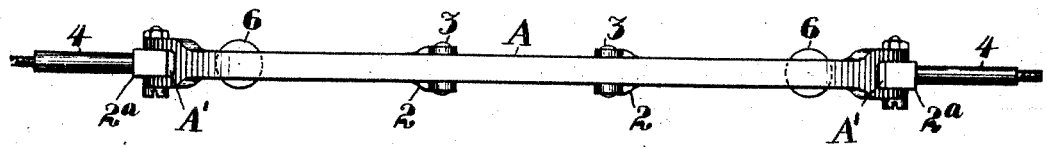

Figure 1 is a side view of my device. Fig. 2 is a plan view of same.

As shown in the drawings, A is the main portion of the axle, which may be made straight, curved upward or downward, or of any suitable or desired form to suit the vehicle for which it is intended, and any suitable or usual connections may be made between the axle and the vehicle, such as clips, by which the vehicle-body may be secured directly to this part of the axle, or springs of any character may be interposed. The ends of the axle A may be split or formed in two parts, as shown at A', or so constructed as to form vertical guides for the independently-movable parts 2, which are here shown as pivoted to the main axle A, as at 3, extending thence beneath the main axle and through the vertical slots or channels A' and having at the outer end the spindles 4, upon which the wheels are mounted.

As shown in the present drawings, the movable axles 2 are bent to have a vertical portion 2ª fitting and movable in the vertical guide-channels A' of the main axle. These and the pivoted points at 3 make the supplemental axles sufficiently stiff to resist any twisting action which may take place. The pivots 3 may be very well formed by splitting the inner ends of the axles 2 or forming them in two parallel sections which extend up on each side of the axle A and the pivot-pins pass through both sides.

6 represents a spring of any suitable or desired construction. It may be made of rubber, cylindrical in form, and with the ends fitting in cups located upon the axles A and 2, respectively, and it may also be surrounded by a supplemental spiral spring, or spiral, leaf, or other springs may be substituted or used in conjunction, the object being in any case to provide a sufficient resilient connection between the two so that when the weight of the vehicle is brought upon the main axle and through it upon the supplemental axles 2 the latter may have a vertical movement with relation to the main axle and a sufficient resiliency to yield and relieve the strains and shocks upon the main axle and its load due to the roughnesses of the road.

Having thus described my invention, what I claim, and desire to secure by Letters Patent, is—

1. The combination of superposed main and supplemental axles with connecting-pivots and vertical guides, and springs interposed between the two.

2. The combination with a main vehicle-axle of supplemental axles having the inner ends fulcrumed to the main axle, spindles or wheel-supports upon the outer ends of the supplemental axles, vertically-depending guides upon the main axles between which the supplemental axles are movable in vertical planes, and resilient springs disposed between the main and supplemental axles.

3. A vehicle-axle composed of a main portion having the ends bent downwardly and separated, supplemental members substantially parallel with the main member and having their inner ends fulcrumed to said main member, said second members passing between the guides at the ends of the main axle and having wheel-carrying spindles upon the outer ends and springs interposed between the main and supplemental axles as herein described.

4. A vehicle-axle composed of a main portion having the ends bent vertically at substantially right angles and separated, supplemental members below and approximately parallel with the main member with their inner ends fulcrumed to said member and wheel-carrying spindles at the outer ends, said supplemental members being bent intermediate of the ends to form slides which are vertically guided and movable between the separated ends of the main axle, and springs interposed between the main and supplemental axles.

In testimony whereof I have hereunto set my hand in presence of two subscribing witnesses.

PETER C. PETERSON.

Witnesses:
HENRY P. TRICOU,
S. H. NOURSE.